United States Patent
Wang

(10) Patent No.: US 7,147,459 B2
(45) Date of Patent: Dec. 12, 2006

(54) CONTROL MECHANISM FOR A ROTARY DISK OF A DUAL-COLOR INJECTION MOLDING MACHINE

(75) Inventor: Jui-Hsiang Wang, Yung Kang (TW)

(73) Assignee: Hwa Chin Machinery Factory Co. Ltd., Tainan Hsien (TW)

( * ) Notice: Subject to any disclaimer, the term of this patent is extended or adjusted under 35 U.S.C. 154(b) by 429 days.

(21) Appl. No.: 10/841,496

(22) Filed: May 10, 2004

(65) Prior Publication Data

US 2005/0249836 A1 Nov. 10, 2005

(51) Int. Cl.
*B29C 45/06* (2006.01)

(52) U.S. Cl. .................................................. 425/576

(58) Field of Classification Search ............... 425/574, 425/575, 576
See application file for complete search history.

(56) References Cited

U.S. PATENT DOCUMENTS 6,402,504 B1 * 6/2002 Hahn et al. ................. 425/574
6,468,458 B1 * 10/2002 Anderson et al. ........... 425/576

* cited by examiner

*Primary Examiner*—Tim Heitbrink
(74) *Attorney, Agent, or Firm*—Rosenberg, Klein & Lee

(57) ABSTRACT

A control mechanism includes two hydraulic cylinders, a valve connected to the cylinders, and an actuating unit for the valve; racks are joined to power output rods of the cylinders, facing each other, and engaging a gear secured on a rotary disk; the valve includes a body, and a rod made to stick out from the body at outward end by a spring; the rod can reduce an oil passage of the body after it is displaced further into the body, and the rod can block the oil passage substantially at an end of its displacement further into the body; the actuating unit is movable with one of the power rod, and has two sloping boards thereon such that the rod will be displaced further into the body when the actuating unit moves with the power rod, and when the sloping boards slide over the outward end of the rod of the valve.

5 Claims, 9 Drawing Sheets

CONTROL MECHANISM FOR A ROTARY DISK OF A DUAL-COLOR INJECTION MOLDING MACHINE

BACKGROUND OF THE INVENTION

1. Field of the Invention

The present invention relates to a control mechanism for a rotary disk of a dual-color injection molding machine, more particularly one, with which the rotary disk can rotate smoothly, and slow down gradually, and won't stop abruptly at an end of a rotation, helping increase efficiency of the molding machine.

2. Brief Description of the Prior Art

Referring to FIG. 8, a conventional injection molding machine 2, which is used for single-color injection molding, includes a bed, a fixed mold support 21 secured on the bed, a movable mold support 22, and an actuating mechanism 24 joined to the movable mold support 22. First and second half parts of a mold 23 are secured on the mold supports 21, and 22 respectively, and the actuating mechanism 24 moves the movable mold support 22 towards the fixed mold support 21 to join the half parts of the mold 23 together.

Referring to FIGS. 9 to 11, another conventional injection molding machine 3, which is used for dual-color injection molding, includes a bed, a fixed mold support 21 secured on the bed, a movable support 22, an actuating mechanism 24 joined to the movable mold support 22, a gear 33 rotary on the movable support 22, a rotary disk 31 joined to the gear 33, and a power source 32. First and second half parts of a mold 23 are fitted on the fixed mold support 21, and the rotary disk 31 respectively, and the actuating mechanism 24 is used for moving the movable support 22 towards the fixed mold support 21 to join the half parts of the mold 23 together. The power source 32 is used for causing angular displacement of the rotary disk 31 for allowing injection of a second color material into the mold 23. The power source 32 includes one or two manual directional select valves 34, several limiting valves 35, and left and right hydraulic cylinders 323, 324 connected to the valves 34, 35. Power output rods of the hydraulic cylinders 323, 324 are respectively connected to left and right racks 321, 322, and toothed sides of the racks 321, 322 face each other, and engage the gear 33. Thus, referring to FIG. 12, both the rotary disk 31 and the second half mold part will turn clockwise when the right cylinder 324 is actuated to project down at the power output rod thereof, and the left cylinder 323 is made to release oil. And, both the rotary disk 31 and the second half mold part will turn counterclockwise when the left cylinder 323 is actuated to project down at the power output rod thereof, and the right cylinder 324 is made to release oil.

However, the power source 32 is found to have disadvantages as followings:

1. The rotary disk 31 is likely to begin and stop movement abruptly, and the second half mold part can't move smoothly if the manual directional select valves 34 are not skillfully operated because the hydraulic cylinders 323, 324 will provide relatively large power for rotating the rotary disk and the second half mold part, and have relatively large diameter.
2. To stop an active one of the hydraulic cylinders 323, 324 at an end of an angular displacement of the rotary disk 31, the operator first has to make oil passages with smaller diameters connected to the active hydraulic cylinder instead of the original oil passages with the help of the manual directional select valves 34 as well as the limiting valves 35 such that speed of the power output rod is reduced, and then has to make oil passages with still smaller diameters connected to the active hydraulic cylinder instead such that the power output rod moves at still lower speed. And, after the above active cylinder stops, the other one of the hydraulic cylinders is actuated for make the rotary disk 31 rotate in the opposite direction. Therefore, the procedure for operating the power source 32 is complicated, and the power source is inefficient, and the rotary disk 31, and the second half mold part will stop movement abruptly, pause many times, and can't move smoothly when the valves 34 are switched; movement of the rotary disk 31, and the second half mold part can be presented with a trapezoid, which means there are pauses.
3. There will be much increase to the instant high pressure in the oil passages because the hydraulic cylinders 323, 324 are controlled in respect of speed, starting, and stoppage by means of changing the flow of hydraulic oil. Consequently, there will be higher rate of breakdown.

SUMMARY OF THE INVENTION

It is a main object of the present invention to provide a control mechanism for a rotary disk of a dual-color injection molding machine to overcome the above disadvantages.

The control mechanism includes a gear, left and right hydraulic cylinders, left and right racks respectively joined to power output rods of the hydraulic cylinders, a valve, and an actuating unit. The gear is joined to the rotary disk. The hydraulic cylinders are disposed such that toothed portions of the left and the right racks face each other, and engage the gear. The valve includes a main body, a rod, and a wheel; the main body is secured in position, and has a holding hole therein, and both an oil inlet and an oil outlet communicating with the holding hole and respectively connected to oil inflow passages, and oil outflow passages; the support rod having an inward end, and an outward end; the support rod is movably passed into the holding hole, and made to stick out from the holding hole at outward end; the rod can reduce an oil passage in the valve main body after it is displaced further into the holding hole, and the rod can block the oil passage substantially at an end of its displacement further into the holding hole; the wheel is fitted on the outward end of the rod; the actuating unit is joined to one of the power output rod, and has an active side facing the wheel of the valve, and two sloping boards secured on the active side thereof, which can cause displacement of the wheel towards the valve main body when they slide over the wheel of the valve.

Thus, near to an end of an action, in which hydraulic oil is made to flow into one of the hydraulic cylinders via the valve for said hydraulic cylinder to cause rotation of the rotary disk, oil flow will be gradually reduced, and finally stopped with one of the sloping boards make the rod of the valve displaced inwardly of the holding hole, and in turns, the rotary disk will slow down gradually, and won't pause or stop abruptly.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 4:
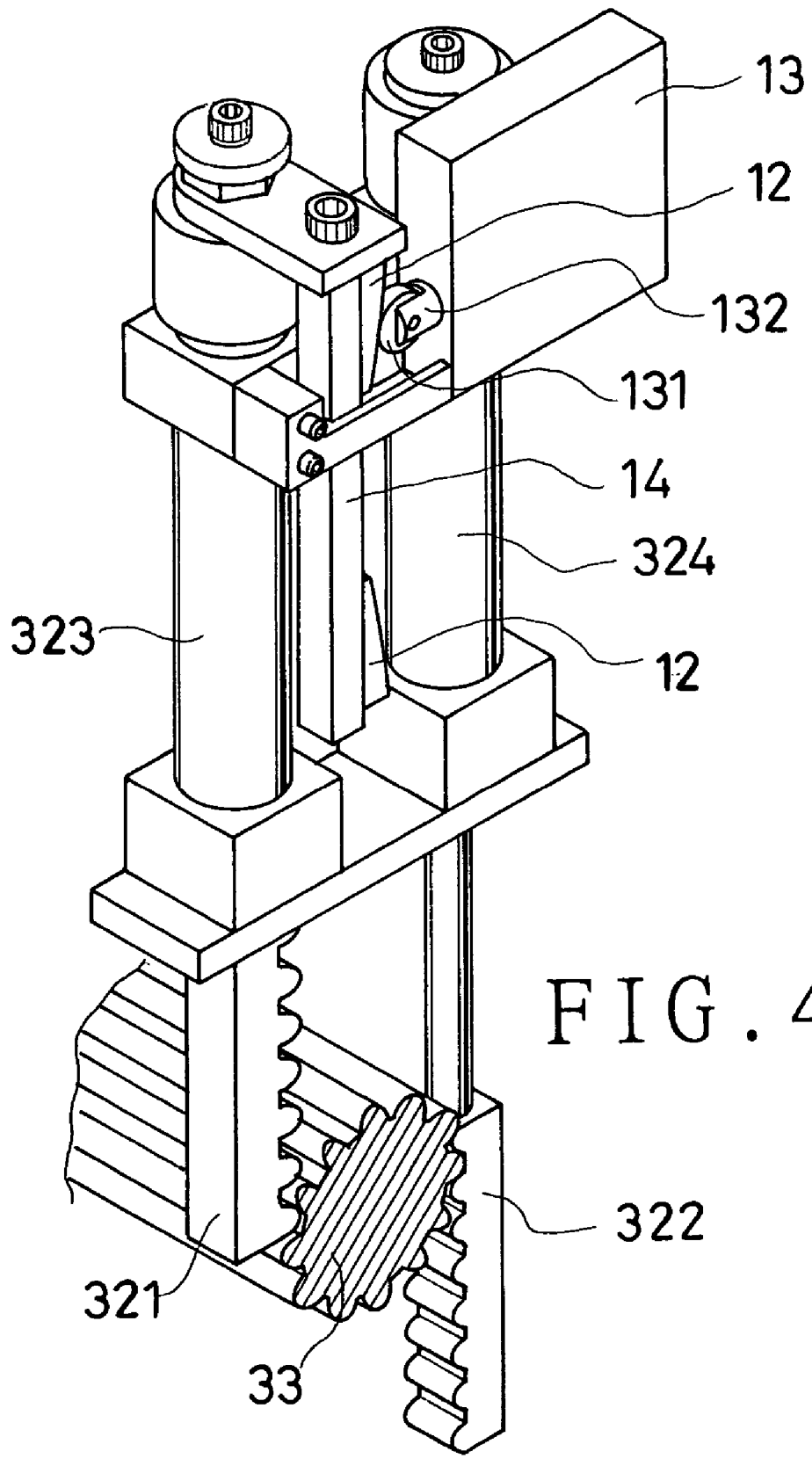
FIG. 4 is a perspective view of the control mechanism according to the present invention.

Referring to FIG. 4, a preferred embodiment of a control mechanism for a rotary disk of a dual-color injection molding machine includes a gear 33, left and right racks 321, 322, left and right hydraulic cylinders 323, 324, a valve 13, and an actuating unit 14 for the valve 13.

The gear 33 is securely joined to a rotary disk of an injection molding machine, which is the same as that of the conventional molding machine described in Background. The left and the right hydraulic cylinders 323, 324 are secured near to the gear 33 on the molding machine. The left and the right racks 321, 322 are respectively securely joined to first ends of power output rods of the left and the right hydraulic cylinders 323, 324, and engage the gear 33 at toothed portions thereof, which face each other.

Figure 5:
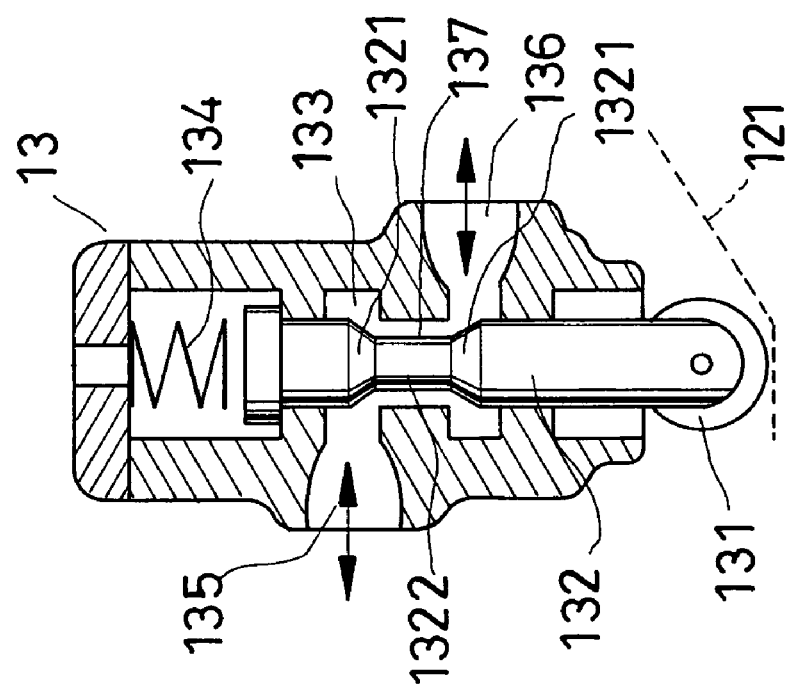
FIG. 5 is a cross-sectional view of the control valve of the present control mechanism, in the open position.
Figure 6:
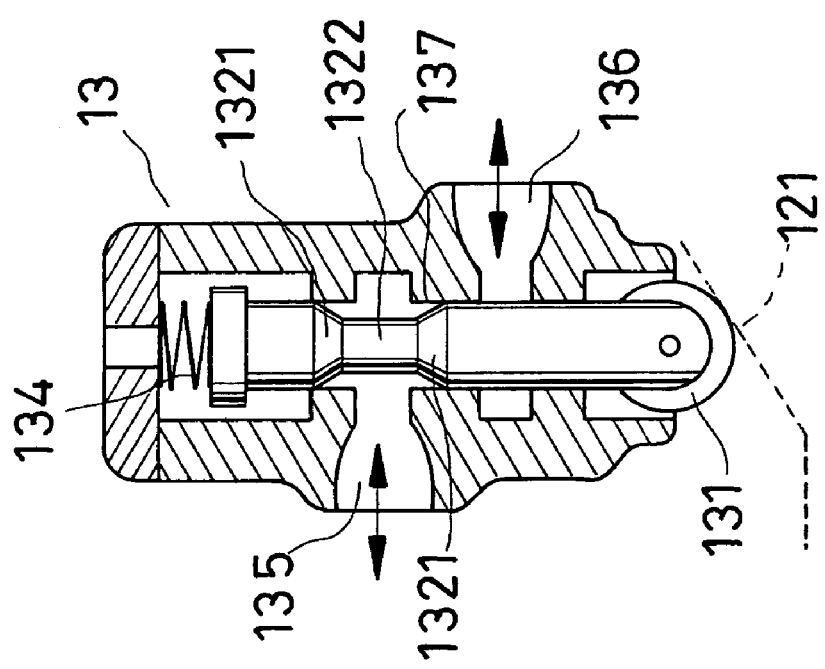
FIG. 6 is a cross-sectional view of the control valve of the present control mechanism, in the closed position.
Figure 13:
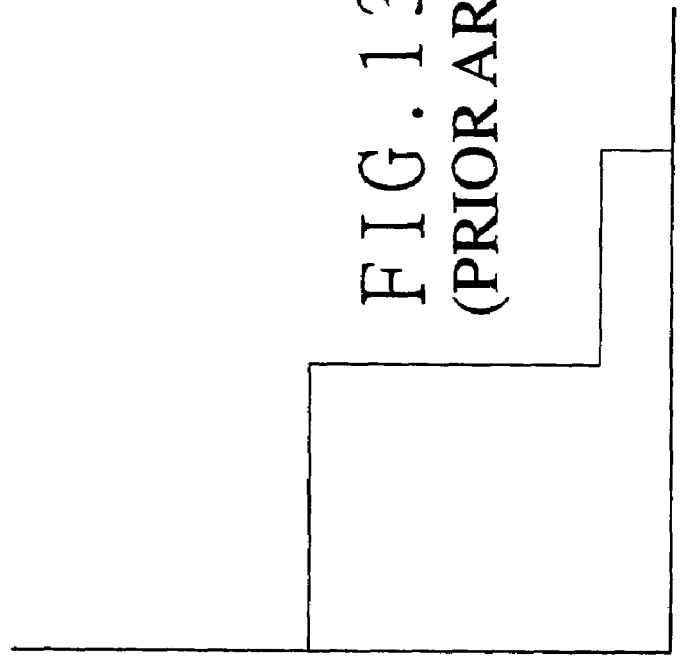
FIG. 13 is a curve showing movement of the rotary disk when the conventional control mechanism functions.

The valve 13 includes a main body secured on a cylinder body of the left hydraulic cylinder 323, which is formed with a holding hole 133 therein, a wheel 131, a support rod 132 movably passed into the holding hole 133, and an elastic element 134 positioned in the holding hole 133 and next to an inward end of the support rod 132 for biasing the support rod 132 outwardly of the holding hole 133. The wheel 131 is fitted on an outward end of the support rod 132. In addition, the main body of the valve 13 is formed with an oil inlet 135, an oil outlet 136, which communicate with the holding hole 133. The support rod 132 is formed with two opposing cone-shaped portions 1321, and a neck portion 1322 between the cone-shaped portions 1321. The holding hole 133 is formed so as to have a passage 137 at a substantially middle thereof whose diameter is larger than the diameter of the neck portion 1322 of the support rod 132, and substantially the same as that of the other portion of the support rod 132. Thus, the neck portion 1322 will be right in the passage 137 of the holding hole 133, and the valve 13 in an open position when the elastic element 134 makes the support rod 132 stick outwards from the holding hole 133 for a longest distance, as shown in FIG. 5. And, the other portion of the support rod 132 will be in the passage 137, and the valve 13 will be in a closed position when an external force is exerted on the support rod 132 to push the rod 132 inwardly of the holding hole 133, and compress the elastic element 134, as shown in FIG. 6.

Furthermore, the oil inlet 135, and the oil outlet 136 are respectively connected to an oil inflow passage 138, and an oil outflow passage 139.

The actuating unit 14 for the valve 13 is securely joined to a second end of the power output rod of the left hydraulic cylinder 323, and faces the wheel 131 of the valve 13 at a first active side thereof. The actuating unit 14 has first and second sloping guide boards 11, 12 secured on the first active side thereof; the sloping guide boards 11, 12 respectively have slopes 111, 121 thereon. The actuating unit 14 won't cause displacement of the support rod 132 towards the main body of the valve 13 when the first active side thereof is over the wheel 131. And, the support rod 132 of the valve 13 will begin to retreat into the holding hole 133 gradually as soon as the sloping guide boards 11, 12 contact the wheel 131 when the control mechanism is in operation, and the valve 13 will be finally made to close by means of the sloping guide boards 11, 12, as shown in FIG. 6. In other words, oil flow through the present control mechanism can be controlled with the valve 13, and the actuating unit 14 together.

Figure 1:
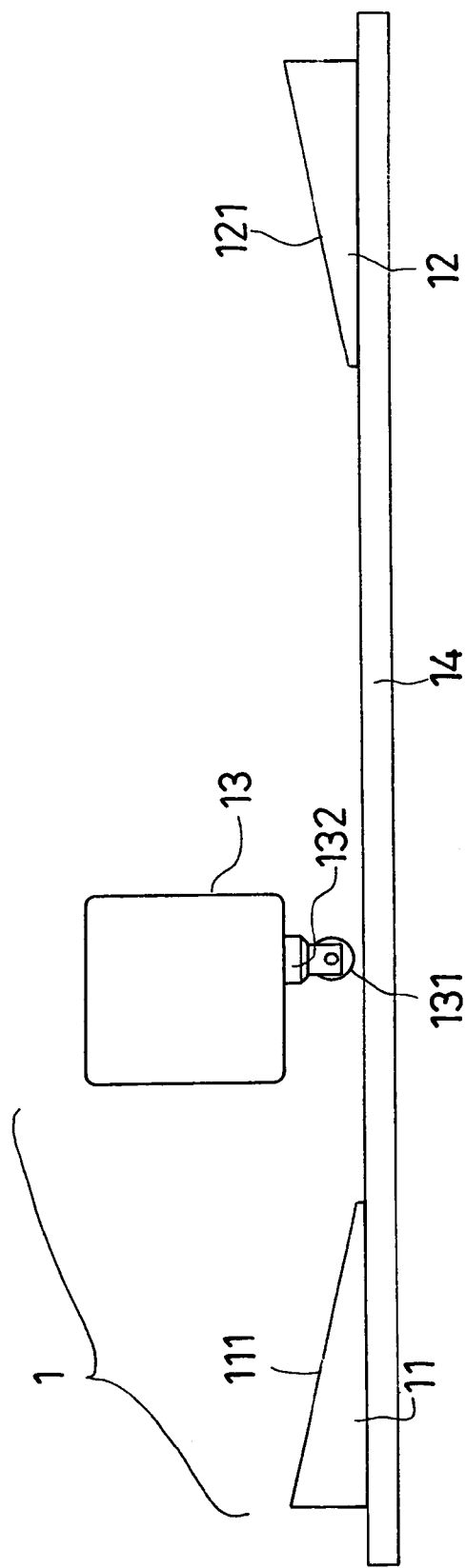
FIG. 1 is a partial view of the first embodiment of a control mechanism in the present invention.
Figure 2:
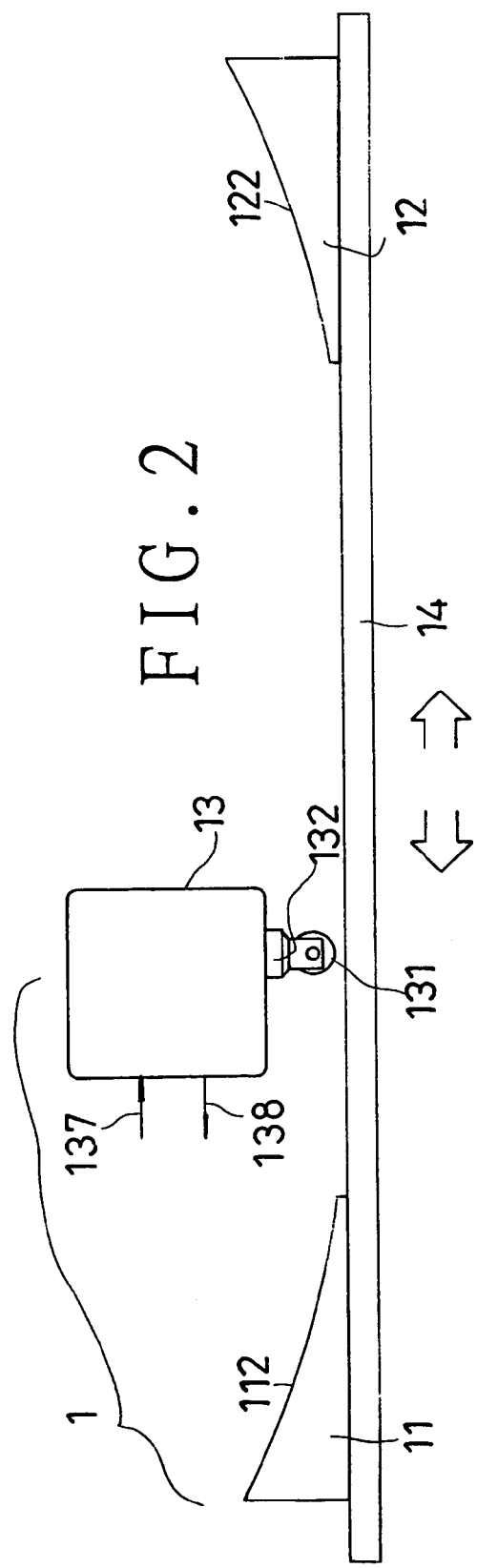
FIG. 2 is a partial view of the second embodiment of a control mechanism in the present invention.
Figure 3:
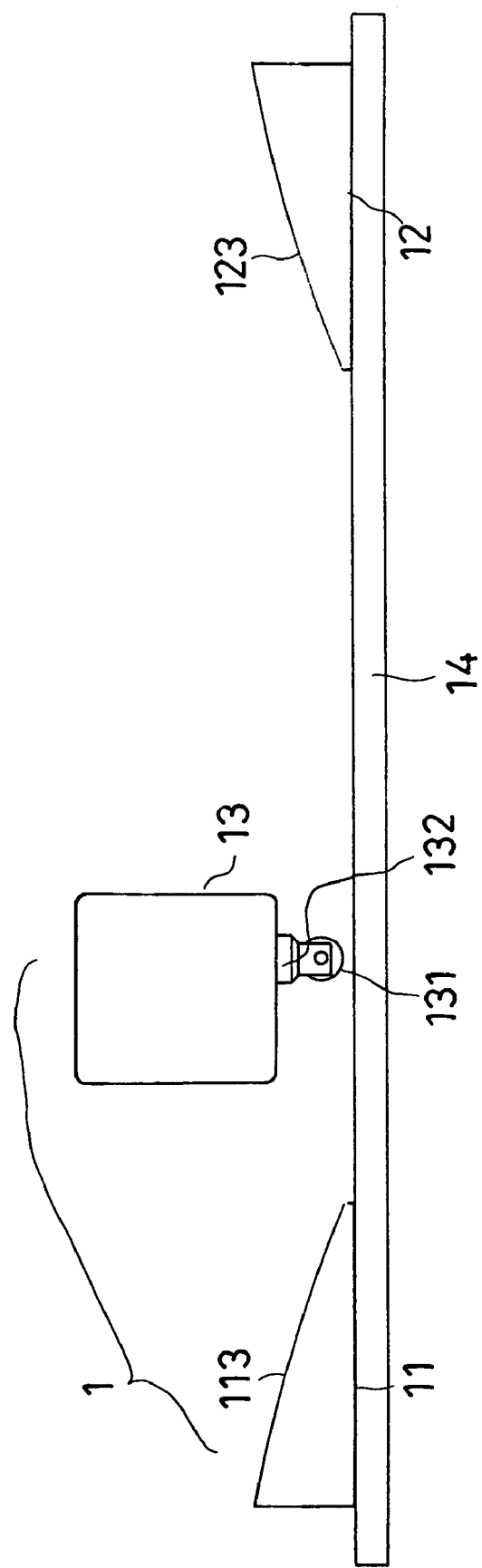
FIG. 3 is a partial view of the third embodiment of a control mechanism in the present invention.

Furthermore, the sloping guide boards 11, 12 can be made in such a way as to have slopes 112, 122 having concavely curvature thereon (FIG. 2) or slopes 113, 123 having convexly curvature thereon (FIG. 3). In addition, the actuating unit 14 can be securely joined to a second end of the power output rod of the right hydraulic cylinder 324, the rack 321 or the rack 322 instead as long as the first active side of the actuating unit 14 is faced with the wheel 131 of the valve 13.

When hydraulic oil is forced into the right hydraulic cylinder 324 via the passage 137 of the valve 13, and the left hydraulic cylinder 323 is made to release oil therefrom, the rack 322, which is secured to the power output rod of the right hydraulic cylinder 324, will be moved downwards together with the power output rod, and the rotary disk of the molding machine will rotate clockwise together with the gear 33; thus, the actuating unit 14 will move upwards together with the power output rod of the left hydraulic cylinder 323 owing to the engagement of the rack 321 with the gear 33. Consequently, oil flow into the right hydraulic cylinder 324 via the passage 137 will be reduced, and finally stopped owing to change of position of the support rod 132 relative to the passage 137, which change of position is caused by the sloping guide board 12. And, the clockwise rotation of the rotary disk will gradually slow down, and finally stop accordingly.

When hydraulic oil is forced into the left hydraulic cylinder 323 via the passage 137 of the valve 13, and the right hydraulic cylinder 324 is made to release oil therefrom, the rack 321 will be moved downwards together with said power output rod to cause counterclockwise rotation of both the gear 33 and the rotary disk of the molding machine. And, the actuating unit 14 will move downwards together with the power output rod of the left hydraulic cylinder 323. Consequently, oil flow into the left hydraulic cylinder 323 via the passage 137 will be reduced, and finally stopped owing to change of position of the support rod 132 relative to the passage 137, which change of position is caused by the sloping guide board 11. And, the counterclockwise rotation of the rotary disk will gradually slow down, and finally stop accordingly.

Figure 7:
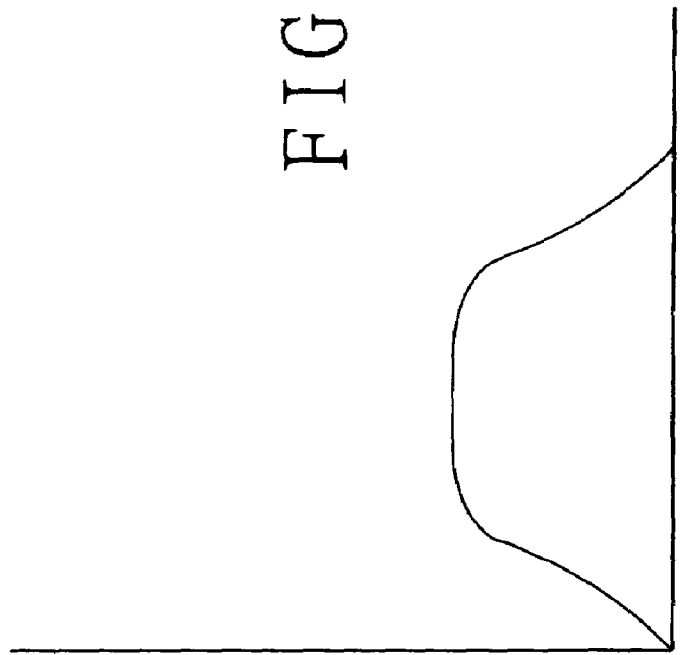
FIG. 7 is a curve showing movement of the rotary disk when the present control mechanism functions.
Figure 8:
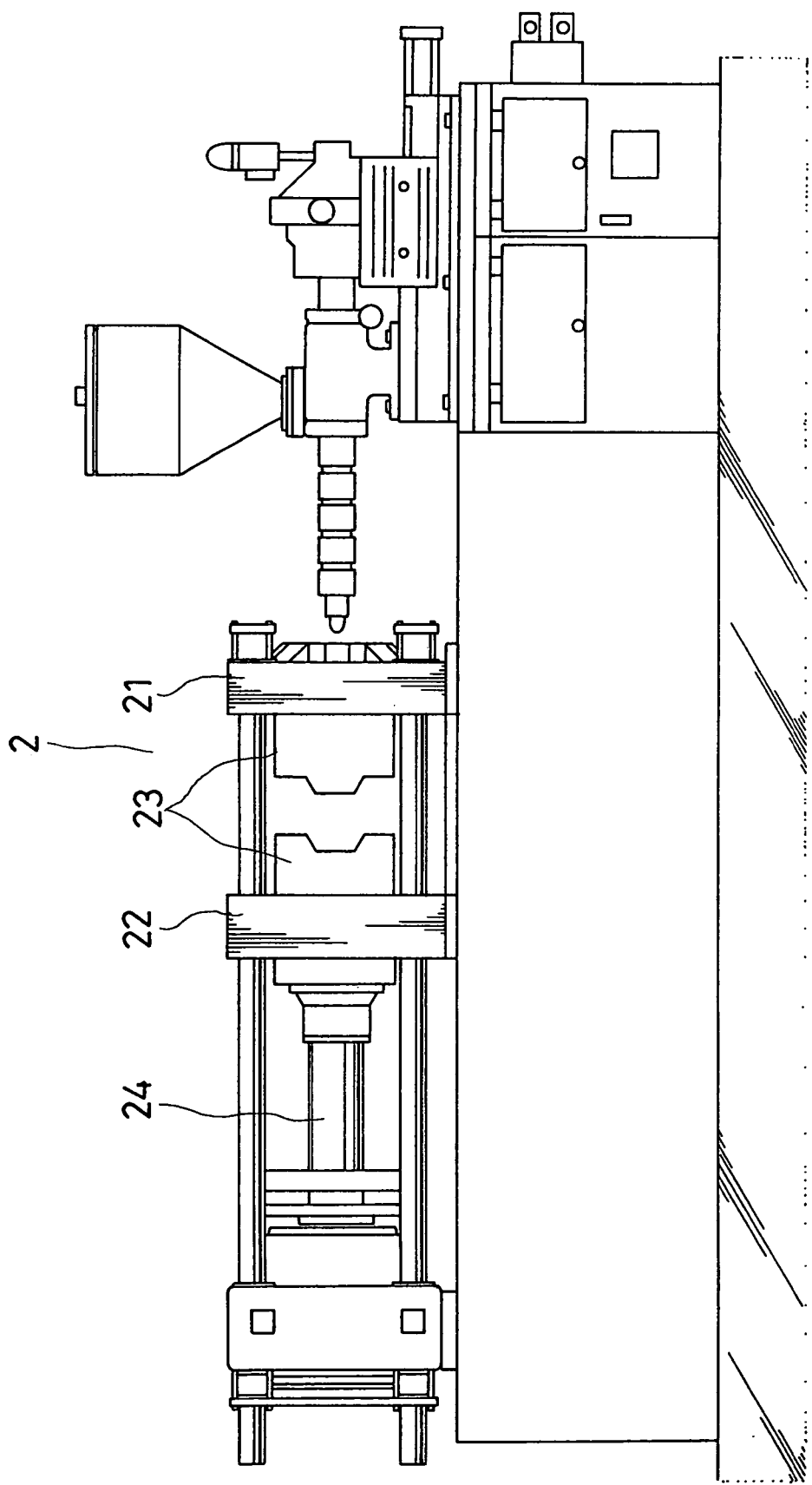
FIG. 8 is a side view of the conventional single-color injection molding machine described in Background.
Figure 9:
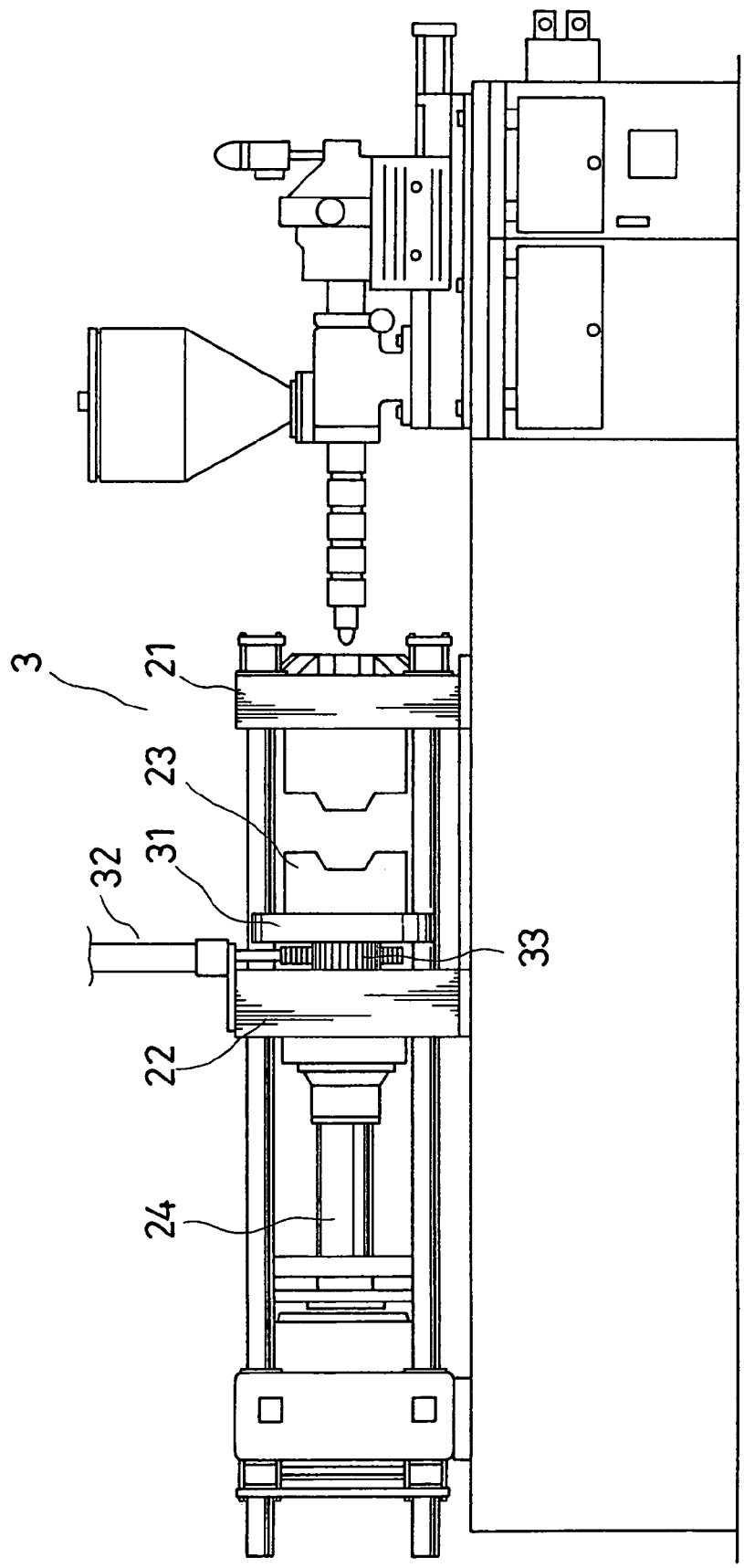
FIG. 9 is a side view of the conventional dual-color injection molding machine.
Figure 11:
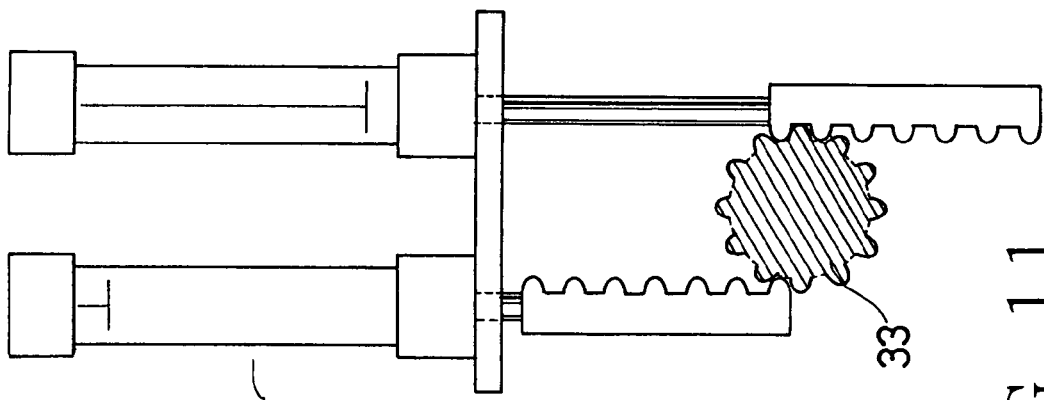
FIG. 11 is a front view of the control mechanism for the rotary disk of the conventional dual-color injection molding machine.
Figure 10:
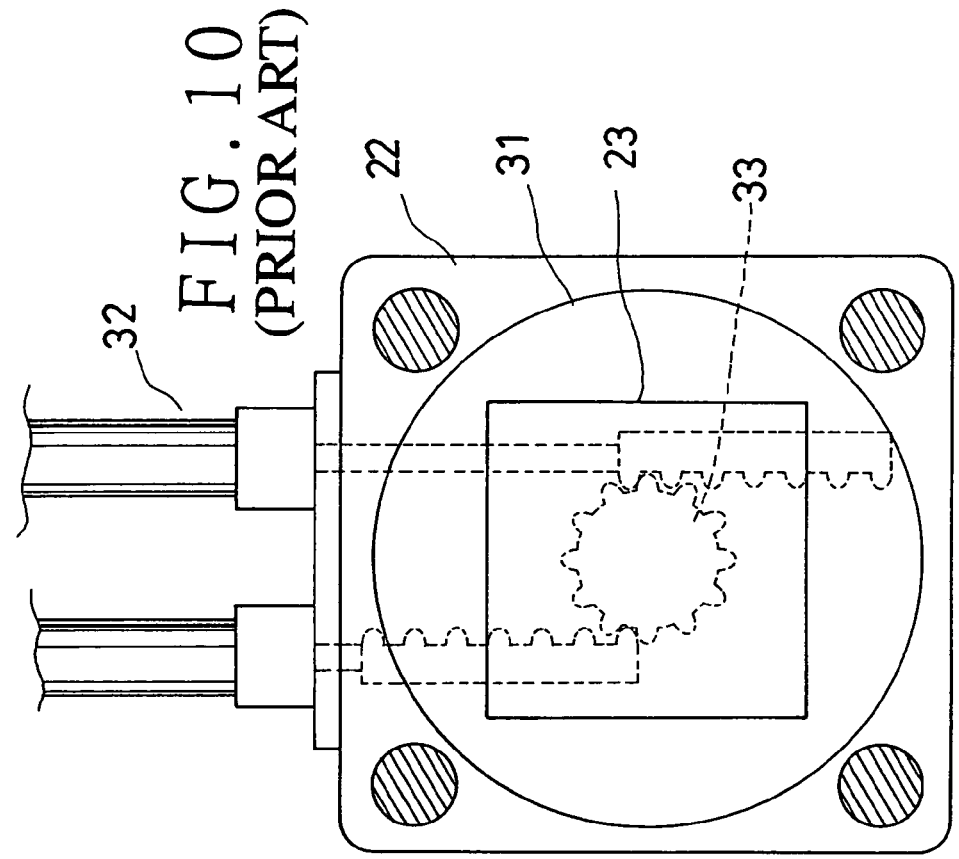
FIG. 10 is a partial front view of the conventional dual-color injection molding machine.
Figure 12:
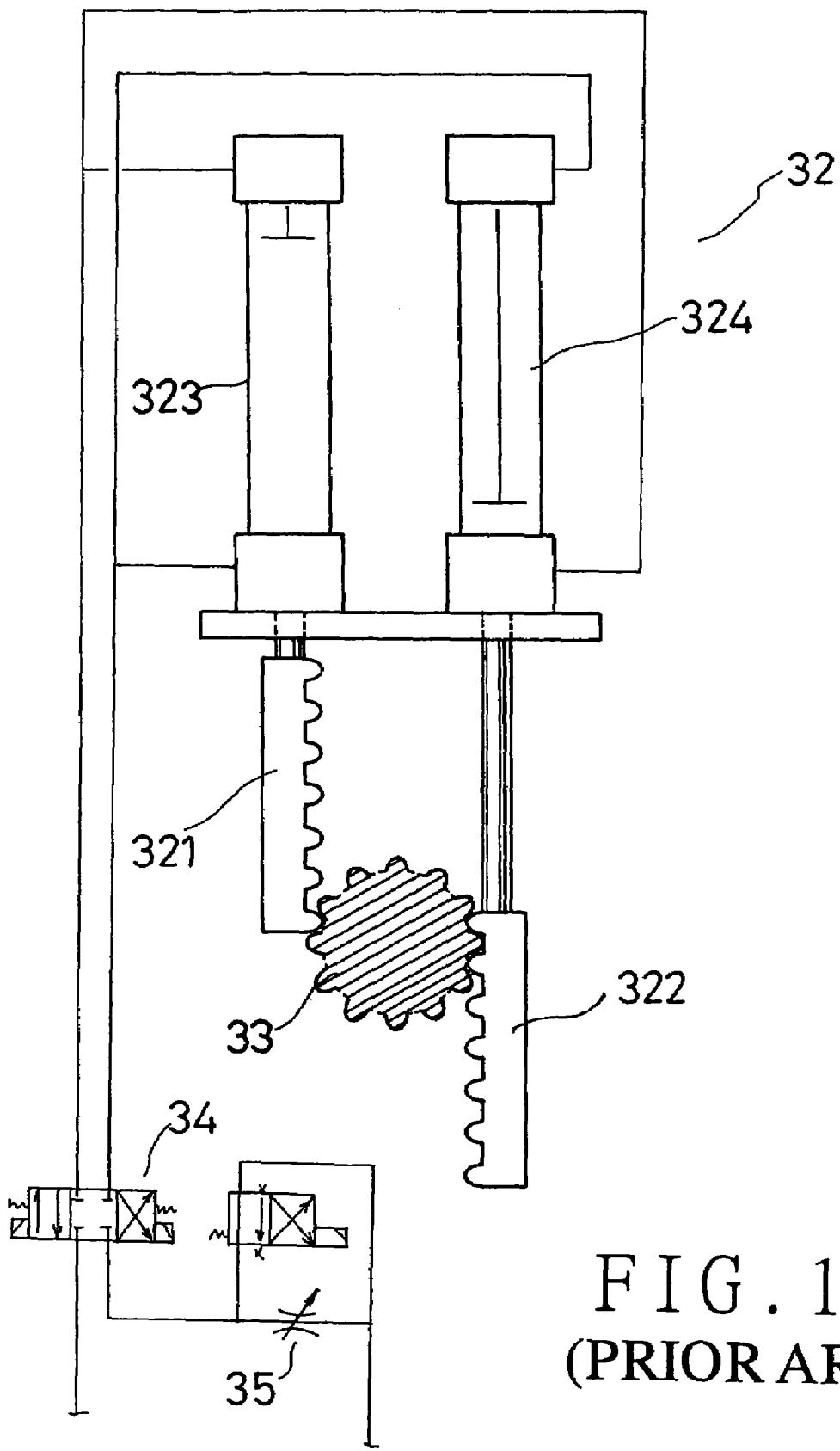
FIG. 12 is a plan of the conventional control mechanism.

Referring to FIG. 7, when the control mechanism functions, change of speed of both the rotary disk and the gear won't be abrupt, and movement of the rotary disk and the gear can be presented with a curve.

From the above description, it can be easily understood that the control mechanism of the present invention has the following advantages when it is compared with the conventional ones:
1. The present mechanism is more efficient. And, the conventional control mechanisms are equipped with a lot of valves, e.g. limiting valves, while the present one isn't. Therefore, the present mechanism has a much simpler structure, and costs much less to build.
2. When the present mechanism is working, and the rotary disk rotates near to a final position thereof, the rotary disk will slow down gradually. Therefore, the rotary disk won't stop or change speed abruptly at any time, and there won't be any pause of the rotary disk, after which pause it takes time for the rotary disk to resume rotation, and in turns, there won't be any waste of time.

What is claimed is:

1. A dual color injection molding machine having a control mechanism controlling a rotary disk said machine, comprising
- a gear securely joined to said rotary disk, which disk is used for holding a first half part of a mold;
- left and right hydraulic cylinders secured near the gear on the molding machine; each of the hydraulic cylinders having a power output rod;
- left and right racks respectively securely joined to first ends of the power output rods of the left and the right hydraulic cylinders; the racks each having a toothed portion on one side thereof; the toothed portions engaging the gear, and facing each other;
- a valve including
  (1) a main body secured in position on the molding machine; the main body being formed with a holding hole therein, an oil inlet communicating with the holding hole, and an oil outlet communicating with the holding hole; the oil inlet and the oil outlet being respectively connected to oil inflow passages and oil outflow passages;
  (2) a support rod having an inward end, and an outward end; the support rod being movably passed into the holding hole from the inward end; the support rod having an elastic element connected thereto for making said support rod stick out from the holding hole at the outward end thereof; the support rod being capable of reducing an oil passage in the main body of the valve after said support rod is displaced further into the holding hole by a pushing force exerted on the outward end thereof; the support rod being capable of blocking the oil passage in the main body of the valve substantially at an end of the displacement further into the holding hole; and
  (3) a wheel fitted on the outward end of the support rod; and
- a actuating unit securely joined to an power output part of one of the hydraulic cylinders; the actuating unit having an active side facing the wheel of the valve; the actuating unit having first and second sloping guide boards secured on the active side thereof; the actuating unit being positioned so as not to cause displacement of the wheel of the valve towards the main body of the valve when the active side thereof slides over the wheel; the sloping guide boards being capable of causing displacement of the wheel towards the main body of the valve when said guide boards slide over the wheel of the valve.

2. The injection molding machine claimed in claim 1, wherein the sloping guide boards have concavely curved sloping surfaces.

3. The injection molding machine claimed in claim 1, wherein the sloping guide boards have convexly curved sloping surfaces.

4. The injection molding machine claimed in claim 1, wherein the actuating unit is secured to one of the power output rods of the hydraulic cylinders.

5. The injection molding machine claimed in claim 1, wherein the actuating unit is secured to one of the racks.

* * * * *